United States Patent [19]

Kerr et al.

[11] Patent Number: 4,902,465
[45] Date of Patent: Feb. 20, 1990

[54] PROCESS FOR FORMING DUST CONTROL MAT WITH NON-CLEATED BORDERS

[75] Inventors: Robert C. Kerr; John H. Murray, both of LaGrange, Ga.

[73] Assignee: Milliken Research Corporation, Spartanburg, S.C.

[21] Appl. No.: 244,184

[22] Filed: Sep. 14, 1988

Related U.S. Application Data

[62] Division of Ser. No. 216,970, Jul. 11, 1988.

[51] Int. Cl.$^4$ .............. B27N 3/12; B29C 43/00
[52] U.S. Cl. .................. 264/257; 156/245; 264/273; 264/319; 264/339; 425/406
[58] Field of Search ............ 264/257, 258, 255, 259, 264/273, 248, 319, 324, 339; 156/245

[56] References Cited

U.S. PATENT DOCUMENTS

| D. 238,538 | 1/1976 | Smith | D 6/226 |
|---|---|---|---|
| 1,271,005 | 7/1918 | Bartlett | 49/29 |
| 2,680,698 | 6/1954 | Schnee | 15/215 |
| 2,737,693 | 3/1956 | Robbins | 52/578 |
| 2,875,541 | 3/1959 | Lefcourt | 40/618 |
| 3,024,518 | 3/1962 | Newton | 428/8 |
| 3,136,833 | 6/1964 | Wikkerink | 264/257 |
| 3,267,191 | 8/1966 | Williams et al. | 264/257 |
| 3,288,663 | 11/1966 | Webb et al. | 264/257 |
| 3,467,391 | 9/1969 | Elesh | 273/195 |
| 3,793,109 | 2/1974 | Dale et al. | 156/245 |
| 3,935,358 | 7/1976 | Wyeth et al. | 156/245 |
| 4,010,302 | 3/1977 | Anderson et al. | 420/95 |
| 4,361,614 | 11/1982 | Moffitt, Jr. | 428/138 |
| 4,481,160 | 11/1984 | Bree | 264/255 |
| 4,522,857 | 6/1985 | Higgins | 420/95 |
| 4,529,639 | 6/1985 | Peoples, Jr. et al. | 264/257 |
| 4,532,098 | 6/1985 | Campbell et al. | 264/257 |
| 4,727,697 | 3/1988 | Vaux | 52/177 |
| 4,731,275 | 3/1988 | Andersen | 420/95 |
| 4,741,065 | 5/1988 | Parkins | 15/217 |

FOREIGN PATENT DOCUMENTS 889566   1/1972   Canada ................... 57/177

Primary Examiner—Jay H. Woo
Assistant Examiner—K. P. Nguyen
Attorney, Agent, or Firm—Earle R. Marden; H. William Petry

[57] ABSTRACT

A cleated dust control mat having a rubber or rubber-like backing in which the longitudinal edges of the rubber-like backing projecting outward from the pile surface thereon is smooth and thicker than the body of the rubber or rubber-like backing material. The thicker edges are produced by using a perforated silicone pad which is narrower than the desired width and has beveled edges thereon to provide a curved transition therein between the body and the longitudinal edges of the backing material.

2 Claims, 2 Drawing Sheets

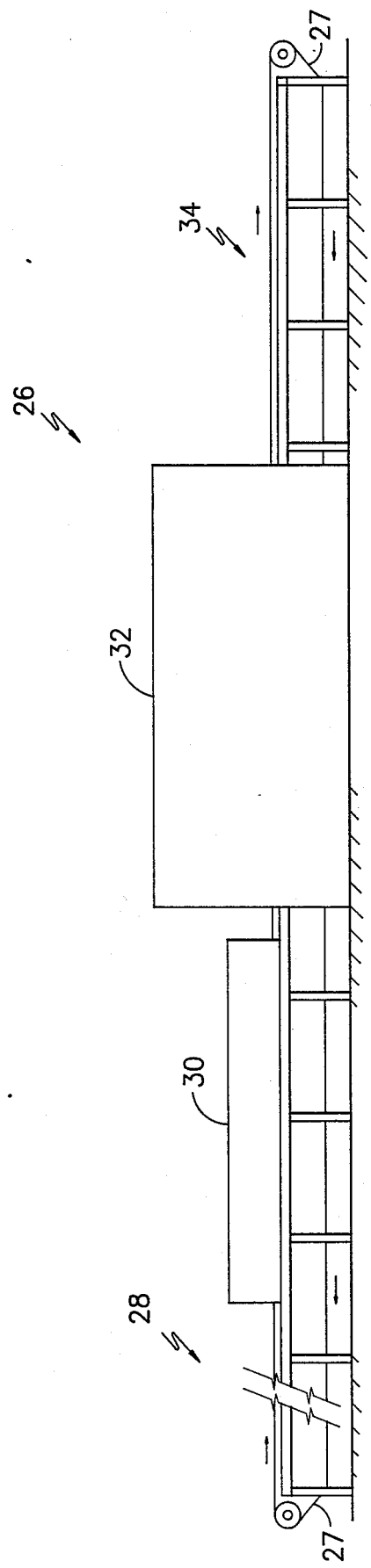

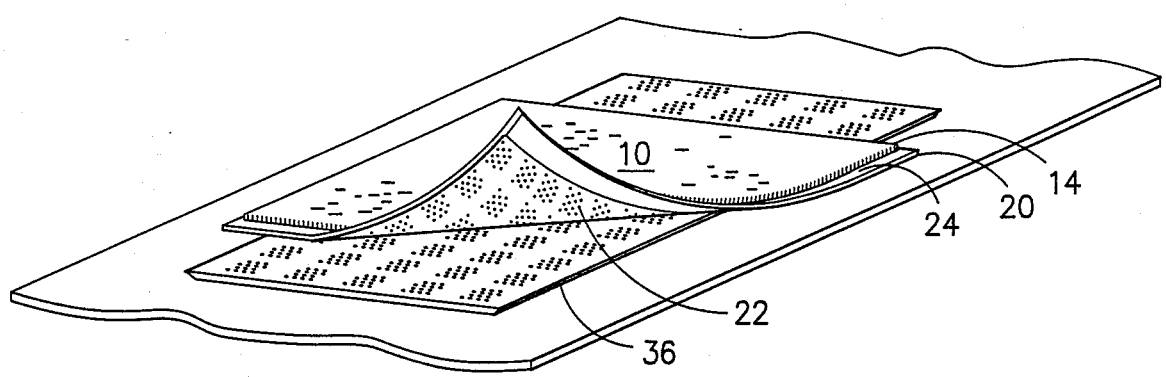
FIG. -2-
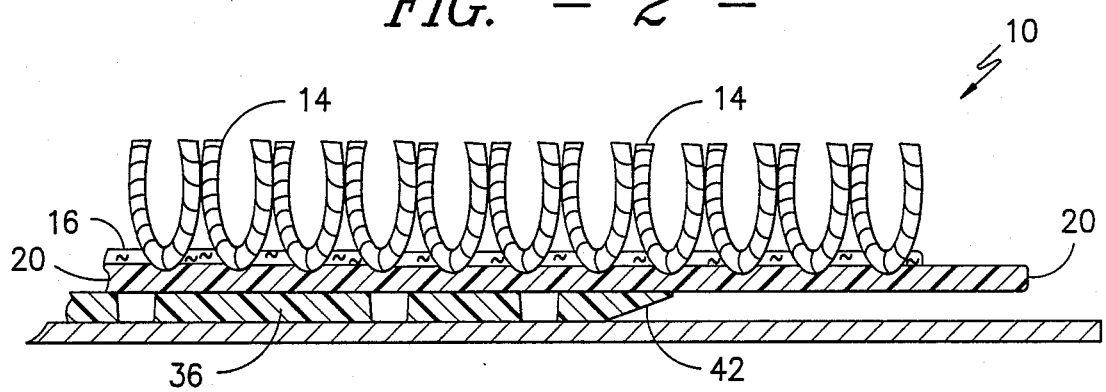
FIG. -3-
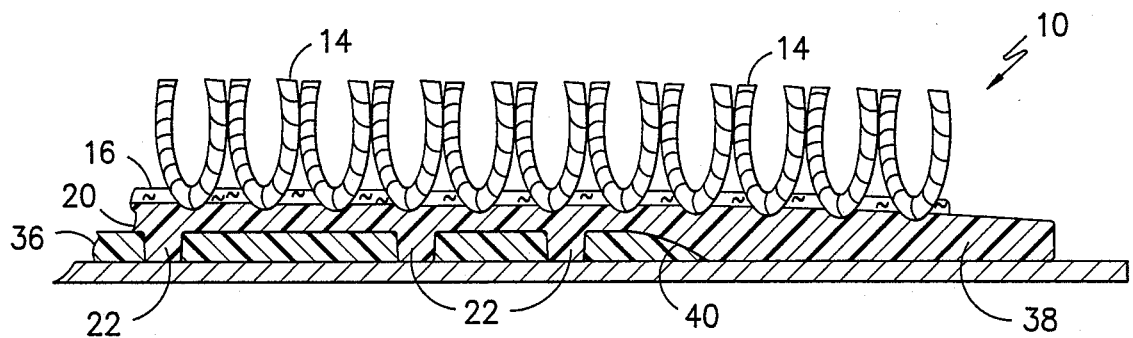
FIG. -4-
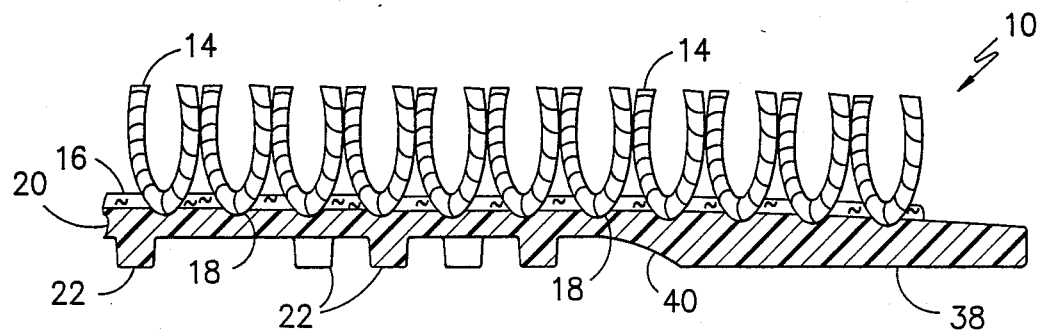
FIG. -5-

PROCESS FOR FORMING DUST CONTROL MAT WITH NON-CLEATED BORDERS

This is a division of application Ser. No. 216,970 filed July 11, 1988 for dust control mat with non-cleated borders.

This invention relates generally to rubber-backed dust control floor mats of the type which have a pile surface on one side and a rubber or rubber-like material on the other side. Mats of this type are generally used in access ways where people tend to brush or scrape their feet in order to prevent carrying of moisture and/or dirt, accumlated on their footwear, into other areas of the premises. Normally these mats are located in areas of high pedestrian traffic, such as doorways.

In recent years certain dust control mats, such as that shown in U.S. Pat. No. 4,761,065, have been molded with cleats on the bottom surface thereof to prevent walking or creeping of the mats when placed on a surface to be protected. It has been found that this type of mat has a tendency to have higher edge rippling than uncleated mats. This rippling effect is very noticeable in those mats in which the cleats on the undersurface thereof extend generally to the edges of the rubber mat.

Therefore, it is an object of this invention to provide a method to produce a cleated dust control mat that has substantially reduced edge rippling characteristics.

Other objects and advantages of the invention will become readily apparent as the specification proceeds to describe the invention with reference to the accompanying drawings, in which:

FIG. 1 is a schematic representation of the dust control mat manufacturing machine;

FIG. 2 shows a molded dust control mat as it exits from the press molding machine;

FIG. 3 is the dust control mat preassembled prior to molding thereof;

FIG. 4 shows the molded dust control mat prior to being stripped off the conveyor belt; and FIG. 5 is a partial cross-sectional view of a completed, vulcanized dust control mat.

In the preferred form of the invention the mats 10 consist of pile yarns 14 of cotton, polyester, etc. tufted through a woven or nonwoven substrate 16 of suitable material with the bottom 18 of the tufts adhered to the rubber or rubber-like backing 20 during vulcanization. Molded integral with or otherwise secured to the bottom of the backing 20 are a plurality of anti-creep cleats 22. Each of the mats commonly have a border portion 24 therearound.

The mat 10 of this invention as assembled, molded and vulcanized on the machine, generally designated 26, of FIG. 1. The machine 26 uses an endless, Teflon-coated conveyor belt 27 to carry the mats 10 from the assembly station 28, through the preheater 30 into the press molding apparatus 32 and out to the separating station 34. The press molding apparatus can be of any suitable type such as that shown in U.S. Pat. No. 4,447,201.

To overcome or alleviate the above-mentioned edge rippling problems it is desired to produce a dust control mat which has the bottom of the outer two longitudinal edges uncleated and a thickness of rubber at such edges which is approximately 10% greater in thickness than the rubber in the body of the rubber mat.

In production of dust control mats prior to the herein-disclosed invention the mats were preassembled at station 28 by just laying down a perforated silicone pad or silicone-like pad such as butyl rubber on the conveyor belt 27. The silicone pad was of a length to accommodate one dust control mat or a plurality of mats and had a width at least equal to the desired width of rubber backing. Then a rubber backing was placed over the silicone pad and a tufted fabric placed on top of the rubber backing. The conveyor belt 27 was then indexed to place the preassembled mat in the preheater 30 which has a temperature in the range of 240° F.–260° F. When the conveyor belt has been indexed another dust control mat is preassembled at station 28 while the first preassembled mat is being preheated after a period of approximately four (4) minutes the conveyor belt 27 is again indexed to place the preheated mat into the press mold 32 and the second preassembled mat into the preheater 30 while a third mat is being preassembled. In the press mold 32, at a temperature in the range of approximately 320° F.–340° F. the rubber backing is vulcanized to the tufted fabric under the action of a pressing force to extrude the soft rubber through the perforations in the silicone pad to form the cleats 22 therein. After another four (4) minutes the conveyor belt 27 is again indexed to move the first vulcanized mat into the stripping station to be removed from the silicone pad and the conveyor belt 27 while the second and third preassemblies are being indexed into the press mold 32 and the preheater 39, respectively, and a fourth preassembled mat is being put together.

It should be understood that a multiplicity of silicone pads can be placed side by side and can be any desired length. Also, depending on the size of the mat a plurality of mats can be treated simultaneously at any one station depending on the size of the assembly station, preheater or press mold, etc. The above-described method produces a dust control mat of reduced thickness due to a portion of the rubber from the rubber backing being used to produce the cleats. This loss of rubber was approximately 10% and contributed to the edge rippling problem.

To overcome this problem a perforated silicone pad 36 was selected which is 2–4 inches narrower along each longitudinal edge so the longitudinal edges 38 will maintain the original rubber thickness while the cleats 22 are being formed on the interior of the mat 10 during press molding. In the preferred form of the invention the smooth longitudinal edge or border 38 will have a thickness of about 52 mils while the body of the rubber backing will have a thickness of about 47 mils thereby providing a stiffening effect at the edges to reduce the tendency to ripple.

To prevent excessive stress between the body of the rubber backing material and the longitudinal edge or border 38 at the transition point 40 it is desired to have a radius of curvature rather than a sharp vertical transition. To accomplish this, as shown in FIG. 3, the longitudinal underedges of the silicone pad are cut at an angle 42 of between 10°–25°, preferably 20°, so that during molding and vulcanization it will bend or deflect over as shown in FIG. 4 to form the radius 40 as shown in FIG. 5.

The above modifications provide a cleated dust control mat in which the rubber backing has smooth longitudinal edges of a thickness of of 10% greater than the thickness of the cleated body of the rubber backing. These thicker longitudinal edges or borders provide a stiffening effect which reduces rippling tendencies and increases tear strength. Increased tear strength is particularly important along longitudinal edges where most of border tearing usually occurs. This additional thickness also causes the edges to curl down to increase the tendency to hug the covered surface. Additionally, since the width of the silicone pads has been reduced, the cost of the pad has been reduced while ease of handling, because of reduced size, has been increased.

Although the preferred embodiment of the invention has been described, it is contemplated that many changes may be made without departing from the scope or spirit of the claims and it is desired that the invention be limited only by the claims.

We claim:

1. A method of forming a unitary dust control mat having a pile fiber upper surface and a rubber-like backing extending beyond at least two edges of the pile fiber upper surface comprising the steps of: placing a perforated silicone-like rubber material having a width less than that of the desired dust control mat on the surface of a conveyor belt, placing a strip of rubber-like material on top of the perforated silicone-like pad so that its longitudinal edges overlap the edges of the silicone-like material, placing a layer of pile fabric on top of the rubber-like material to form a form a layered structure, indexing the layered structure into a heated press molding machine, applying pressure to the layered structure in the press molding machine to vulcanize the rubber-like material and cause the rubber-like material to pass through the perforations in the silicone-like material to form cleats, causing the longitudinal edges of the rubber-like material to bend over the edges of the silicone-like material to form uncleated portions of a thickness greater than that of the body of the rubber-like material, indexing the vulcanized and adhered layered structure to a stripping station outside the press molding machine and stripping the composite structure from the conveyor belt and the silicone-like material.

2. The method of claim 1 wherein the layered structure is preheated prior to passage into the press molding machine.

* * * * *